United States Patent
Williams et al.

(10) Patent No.: US 11,407,175 B2
(45) Date of Patent: Aug. 9, 2022

(54) PREHEAT THREE-DIMENSIONAL (3D) PRINTER BUILD MATERIAL

(71) Applicant: HEWLETT-PACKARD DEVELOPMENT COMPANY, L.P., Houston, TX (US)

(72) Inventors: Kenneth Williams, Vancouver, WA (US); Brent Ewald, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1019 days.

(21) Appl. No.: 16/075,219

(22) PCT Filed: Apr. 20, 2017

(86) PCT No.: PCT/US2017/028635
§ 371 (c)(1),
(2) Date: Aug. 3, 2018

(87) PCT Pub. No.: WO2018/194623
PCT Pub. Date: Oct. 25, 2018

(65) Prior Publication Data
US 2021/0197468 A1     Jul. 1, 2021

(51) Int. Cl.
*B29C 64/314* (2017.01)
*B33Y 30/00* (2015.01)
(Continued)

(52) U.S. Cl.
CPC .......... *B29C 64/314* (2017.08); *B29C 64/153* (2017.08); *B29C 64/205* (2017.08);
(Continued)

(58) Field of Classification Search
CPC .............................. B29C 64/295; B29C 64/153
See application file for complete search history.

(56) References Cited

U.S. PATENT DOCUMENTS

| 4,783,287 A | 11/1988 | Eichberger et al. |
| 7,850,885 B2 | 12/2010 | Philippi et al. |

(Continued)

FOREIGN PATENT DOCUMENTS

| DE | 102014204580 A1 | 9/2017 |
| WO | 09629192 A1 | 9/1996 |

(Continued)

OTHER PUBLICATIONS

Shirazi et al., "A Review on Powder-based Additive Manufacturing for Tissue Engineering: Selective Laser Sintering and Inkjet 3D Printing", Science and Technology of Advanced Materials, vol. 16, Retrieved from Internet: http://iopscience.iop.org/article/10.1088/1468-6996/16/3/033502/pdf, 2015, 20 pages.

*Primary Examiner* — Niki Bakhtiari
*Assistant Examiner* — John J DeRusso
(74) *Attorney, Agent, or Firm* — HP Inc. Patent Department

(57) ABSTRACT

In some examples, preheat three-dimensional (3D) printer build material can include a heating plate of a 3D printer to preheat build material from below the build material, where the heating plate is located adjacent to a build platform of the 3D printer, and a heater-spreader carriage of the 3D printer to preheat the build material from above the build material and spread the preheated build material from the heating plate to the build platform.

8 Claims, 5 Drawing Sheets

(51) Int. Cl.
  *B29C 64/295* (2017.01)
  *B33Y 40/10* (2020.01)
  *H05B 3/00* (2006.01)
  *H05B 3/22* (2006.01)
  *B29C 64/205* (2017.01)
  *B33Y 10/00* (2015.01)
  *B29C 64/153* (2017.01)

(52) U.S. Cl.
  CPC ............ *B29C 64/295* (2017.08); *B33Y 10/00* (2014.12); *B33Y 30/00* (2014.12); *B33Y 40/10* (2020.01); *H05B 3/0038* (2013.01); *H05B 3/22* (2013.01)

(56) References Cited

U.S. PATENT DOCUMENTS

| | | |
|---|---|---|
| 9,339,972 B2 | 5/2016 | Gordon |
| 2005/0263933 A1 | 12/2005 | Welch et al. |
| 2015/0321255 A1 | 11/2015 | Colin et al. |
| 2016/0228949 A1 | 8/2016 | Schwarze |
| 2016/0375491 A1 | 12/2016 | Swaminathan et al. |
| 2017/0021418 A1* | 1/2017 | Ng .................. B33Y 10/00 |
| 2017/0021419 A1 | 1/2017 | Ng et al. |

FOREIGN PATENT DOCUMENTS

| | | | |
|---|---|---|---|
| WO | 2016049621 A1 | 3/2016 | |
| WO | 2016053312 A1 | 4/2016 | |
| WO | 2017014964 A1 | 1/2017 | |
| WO | 2017021957 A1 | 2/2017 | |
| WO | WO-2018189701 A1 * | 10/2018 | ............ B33Y 30/00 |

\* cited by examiner

PREHEAT THREE-DIMENSIONAL (3D) PRINTER BUILD MATERIAL

BACKGROUND

A three-dimensional (3D) printer may be used to create different 3D objects. 3D printers may utilize additive manufacturing techniques to create the 3D objects. For instance, a 3D printer may deposit material in successive layers in a build area of the 3D printer to create a 3D object. The material can be selectively fused, or otherwise solidified, to form the successive layers of the 3D object.

DETAILED DESCRIPTION

Some 3D printers can utilize a build material to create 3D objects that has a powdered and/or granular form. The 3D printer may apply build material in successive layers in a build area to create 3D objects. The build material can be fused, and a next successive layer of build material may be applied to the build area.

As used herein, the term "3D printer" can, for example, refer to a device that can create a physical 3D object. In some examples, the 3D printer can create the 3D object utilizing a 3D digital model. The 3D printer can create the 3D object by, for example, depositing a build material such as powder, and a binder material, in a build area of the 3D printer. The build material may be deposited in successive layers in the build area to create the 3D object. In some examples, a 3D printer can create the 3D object utilizing powder bed fusion, among other types of 3D printing.

A build area of the 3D printer may be kept at a constant temperature. The constant temperature of the build area of the 3D printer can allow for successful fusing of the build material in the different layers of the 3D object. Preheating the build material prior to being deposited in the build area can help keep the build area of the 3D printer at the constant temperature.

Preheating the build material while transporting the build material to the build area can raise the temperature of the build material prior to the build material being deposited in the build area of the 3D printer. However, preheating the build material too early can cause the build material to glomerate and/or consolidate, making the build material difficult to transport and/or deposit as a layer in the build area of the 3D printer.

Preheating 3D printer build material can allow for build material to be preheated prior to being deposited in the build area of the 3D printer without the build material becoming difficult to deposit from being preheated too early. The build material can be preheated to maintain the constant temperature of the build area of the 3D printer.

Figure 1:
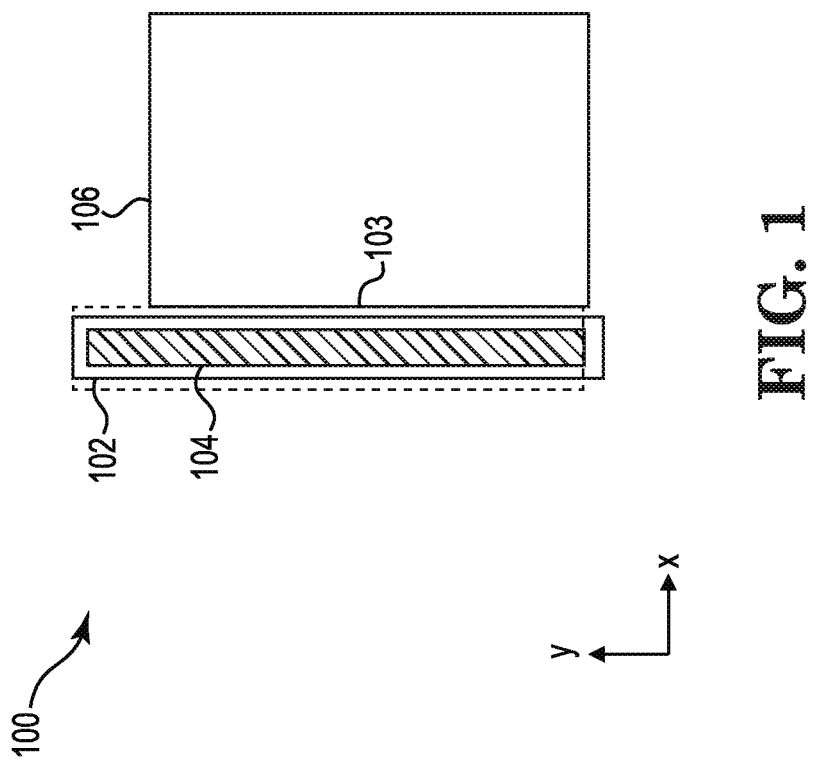
FIG. 1 illustrates a top view of an example of a system to preheat 3D printer build material consistent with the disclosure.

FIG. 1 illustrates a top view 100 of an example of a system to preheat 3D printer build material consistent with the disclosure. The system may include a heating plate 102, a radiative heat source 103, build material 104, and a build platform 106.

As illustrated in FIG. 1, the top view 100 of the system can be oriented in an x-y coordinate plane. For example, the x coordinate as shown in FIG. 1 can be a length and the y coordinate as shown in FIG. 1 can be a width.

As shown in FIG. 1, the system can include heating plate 102. Heating plate 102 can be a plate that can preheat build material 104 from below build material 104. For example, build material 104 can be deposited on heating plate 102 prior to being spread to build platform 106, and heating plate 102 can preheat build material 104 from below build material 104. Heating plate 102 can be a plate made of metal, although examples of the disclosure are not limited to a metal plate. For example, heating plate 102 can be made of polymeric material and/or of other materials. As used herein, the term "preheat" can, for example, refer to heating a temperature of build material 104 from a first temperature to a second temperature. In some examples, heating plate 102 can be constantly powered. In some examples, heating plate 102 can be powered in response to build material 104 being deposited thereon.

The first temperature can be the temperature of the build material when deposited on heating plate 102, The first temperature can be an ambient temperature, among other temperatures. As an example, the first temperature can be 40° C., among other temperatures.

The second temperature can be the temperature of build platform 106, among other temperatures. The second temperature can be a predetermined temperature. The first temperature can be less than the second temperature. As an example, the second temperature can be 120° C.

Build material 104 may have to be preheated quickly from a first temperature to a second temperature. For example, delays in preheating build material 104 may cause delays in a 3D print job, resulting in longer print times. Preheating 3D printer build material can allow for efficient heat transfer to build material 104, allowing for fast build material preheat times and reducing chances of delays in a 3D print job. In some examples, build material 104 can be preheated from 40° C. to 120° C. In some examples, build material 104 can be preheated from 60° C. to 100° C.

As used herein, the term "build material" can refer to a material used to create 3D objects in the 3D printer. Build material 104 can be, for example, a powdered semi-crystalline thermoplastic material, a powdered metal material, a powdered plastic material, a powdered composite material, a powdered ceramic material, a powdered glass material, a powdered resin material, and/or a powdered polymer material, among other types of powdered or particulate material.

Heating plate 102 can be located adjacent to build platform 106. As used herein, the term "build platform" can, for example, refer to a build location of the 3D printer, such as a powder bed. For example, the 3D printer may deposit build material in successive layers in build platform 106 to create a 3D object in build platform 106. In some examples, build platform 106 can be removable from the 3D printer. In some examples, build platform 106 can be integrated with the 3D printer.

The system can include a radiative heat source 103. Radiative heat source 103 can be located above heating plate 102. Radiative heat source can preheat build material 104 by radiation. As used herein, the term "radiation" can, for example, refer to a process by which energy is transmitted in the form of waves (e.g., electromagnetic waves) or particles. For example, radiative heat source 103 can transmit wave energy through the medium between radiative heat source 103 and build material 104, Build material 104 can be heated as a result of the transmitted wave energy from radiative heat source 103.

Radiative heat source 103 can be an infrared (IR) lamp that can preheat build material 104. As used herein, the term "infrared" can refer to electromagnetic radiation with wavelengths from 400 nanometers (nm) to 1 millimeter (mm). However, examples of the disclosure are not limited to IR radiation. For example, UV radiation can be used to preheat build material 104, among other types of radiation. That is, a UV lamp may be utilized to preheat build material 104 from above build material 104. The type of radiation can depend on the material type of build material 104, etc.

In some examples, radiative heat source 103 can be fixed above heating plate 102. For example, radiative heat source 103 can be a static radiative heat source to preheat build material 104 from above build material 104.

Figure 3:
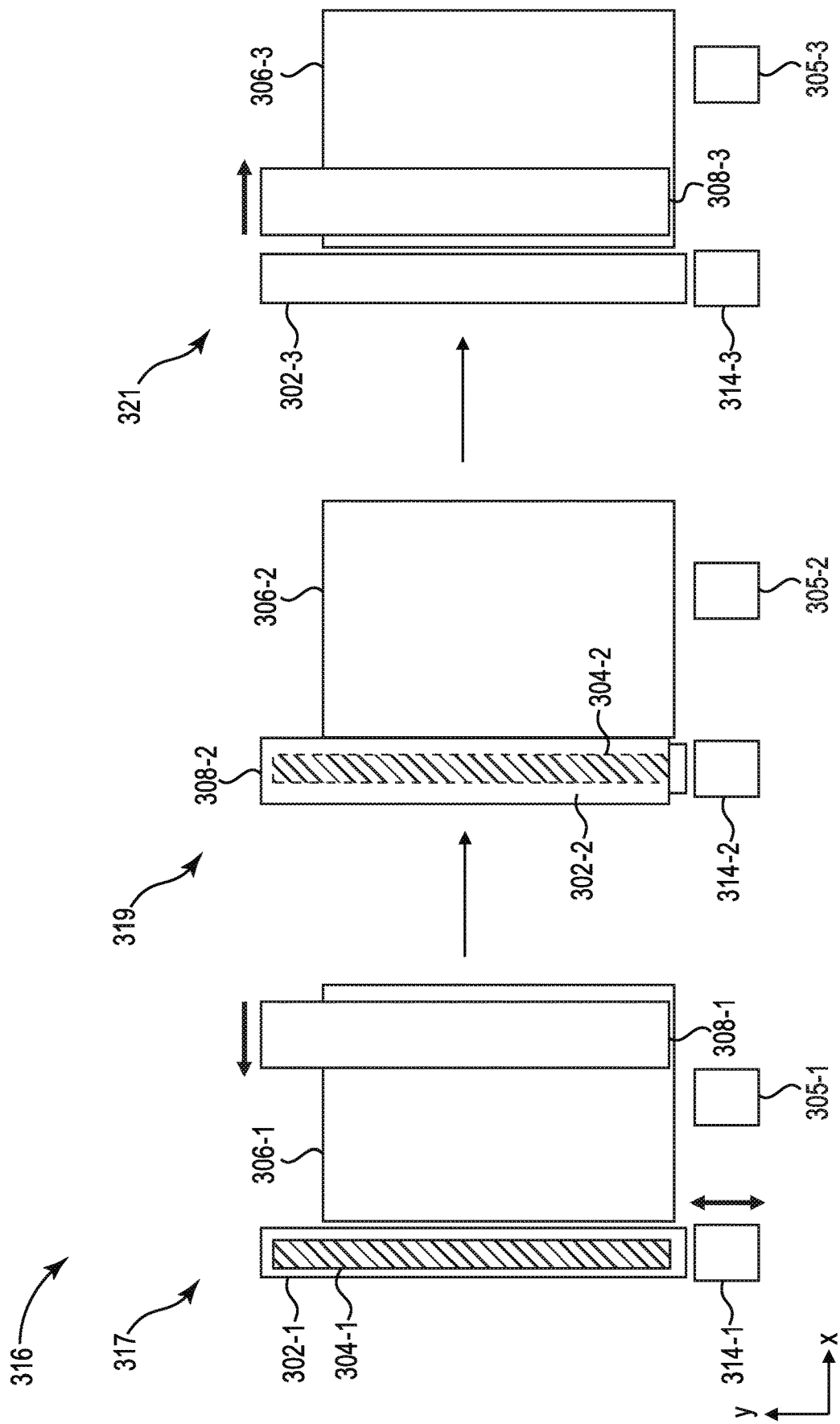
FIG. 3 illustrates a top view of an example preheat sequence of a system to preheat 3D printer build material consistent with the disclosure.

In some examples, radiative heat source 103 can be included in a heater-spreader carriage, as is described with respect to FIG. 3, For example, radiative heat source 103 can move relative to heating plate 102. The heater-spreader carriage can move to build material 104 so that the radiative heat source 103 included in the heater-spreader carriage can preheat build material 104 from above build material 104.

Figure 2:
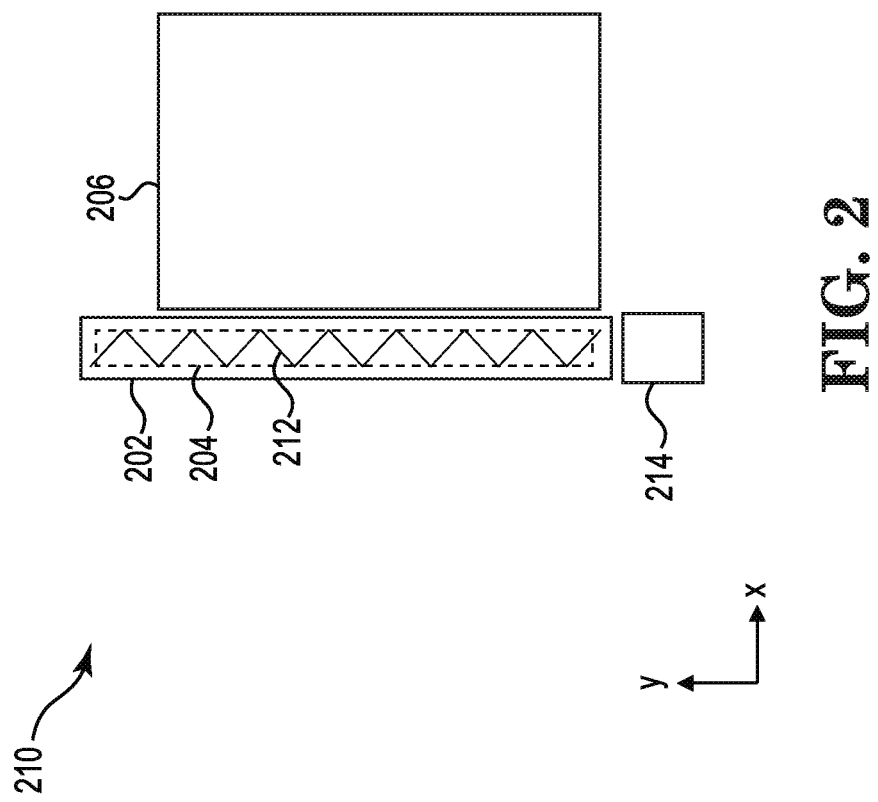
FIG. 2 illustrates a top view of an example of a system to preheat 3D printer build material consistent with the disclosure.

FIG. 2 illustrates a top view 210 of an example of a system to preheat 3D printer build material consistent with the disclosure. The system may include heating plate 202, build material 204, build platform 206, resistive heater 212, and ribbon carriage 214.

As illustrated in FIG. 2, the top view 210 of the system can be oriented in an x-y coordinate plane. For example, the x coordinate as shown in FIG. 2 can be a length and the y coordinate as shown in FIG. 2 can be a width.

As shown in FIG. 2, the system can include a heating plate 202 to receive a substantially uniform deposit of build material 204 from ribbon carriage 214 of the 3D printer. As used herein, the term "ribbon carriage" can, for example, refer to a device that can deposit build material 204 on heating plate 202, Ribbon carriage 214 can deposit build material 204 on heating plate 202 in a substantially uniform deposit. For example, build material 204 can be deposited in a substantially geometric manner. For instance, build material 204 can be deposited by ribbon carriage 214 on heating plate 202 in a substantially rectangular deposit with a substantially uniform thickness.

As used herein, the term substantially intends that the characteristic does not have to be absolute, but is close enough so as to achieve the characteristic. For example, "substantially uniform" is not limited to absolute uniformity. For example, "substantially geometric" is not limited to absolutely geometric. For example, "substantially rectangular" is not limited to absolutely rectangular. For example, "substantially uniform thickness" is not limited to an absolutely uniform thickness.

Although build material 204 is described above as being deposited in a substantially rectangular deposit, examples of the disclosure are not so limited. For example, build material 204 can be deposited by ribbon carriage 214 in a triangular or trapezoidal deposit, among other geometrically shaped deposits. In some examples, build material 204 can be deposited by ribbon carriage 214 with a saw-toothed top surface (e.g., the surface of build material 204 exposed to radiative heating by the radiative heat source), among other build material surface patterns.

Heating plate 202 can include a resistive heater 212. As used herein, the term "resistive heater" can, for example, refer to a heater that can convert electricity into heat through resistive heating. For example, electric current can be passed through a heating element of resistive heater 212, and the resistance encountered by the current in the heating element can generate heat.

Resistive heater 212 can preheat the substantially uniform deposit of build material 204 by conduction. As used herein, the term "conduction" can, for example, refer to a process by which heat (e.g., thermal energy) is transmitted through a substance as a result of a difference in temperature between two regions of the substance. For example, resistive heater 212 can generate heat in one location of heating plate 202. The temperature of a different location, such as a portion of heating plate 202 that build material 204 is resting on, may be lower than the temperature of heating plate 202 next to resistive heater 212. As a result of the temperature difference, thermal energy in the form of heat can be transmitted from resistive heater 212 to the portion of heating plate 202 that build material 204 is resting on. Build material 204 may be at a different temperature than heating plate 202, and thermal energy in the form of heat can be transmitted from heating plate 202 to build material 204.

The substantially uniform deposit of build material 204 can be preheated by resistive heater 212 from below build material 204. For example, resistive heater 212 can be located in heating plate 202 which can be below build material 204. Heat generated from resistive heater 212 can be conducted from below build material 204 to build material 204.

Although build material 204 is described above as being preheated by a resistive heater from below build material 204, examples of the disclosure are not so limited. For example, build material 204 can be preheated from below build material 204 by an inductive heater, a magneto-resistive heater, a flame, etc.

FIG. 3 illustrates a top view 316 of an example preheat sequence of a system to preheat 3D printer build material consistent with the disclosure. The system can include heating plate 302, build material 304, controller 305, build platform 306, heater-spreader carriage 308, and ribbon carriage 314.

As illustrated in FIG. 3, the top view 316 of the system can be oriented in an x-y coordinate plane. For example, the x coordinate as shown in FIG. 3 can be a length and the y coordinate as shown in FIG. 3 can be a width.

The system can include heater-spreader carriage 308. As used herein, the term "heater-spreader carriage" can, for example, refer to a device that can spread build material 304 to build platform 306. Heater-spreader carriage 308 can include an infrared (IR) lamp (not shown) that can preheat build material 304.

Heater-spreader carriage 308 can preheat build material 304 from above build material 304. For example, build material 304 can be deposited on heating plate 302 prior to being spread to build platform 306, and heater-spreader carriage 308 can preheat build material 304 from above build material 304, as is described herein.

As illustrated in FIG. 3, the system is shown at different times in the preheat sequence shown in FIG. 3. The system can be shown at a first time 317 of the preheat sequence, a second time 319 of the preheat sequence, and a third time 321 of the preheat sequence. The respective illustrated times of the preheat sequence as shown in FIG. 3 can be represented by a reference numeral, a hyphen, and a digit following the hyphen. For example, an element or component at first time 317 can be represented by reference numeral 302-1, and the element or component corresponding to reference numeral 302 can be described at second time 319 by 302-2 and/or third time 321 by 302-3.

Ribbon carriage 314 can deposit build material 304 on heating plate 302 in a substantially uniform manner. Although not shown in FIG. 3 for clarity and so as not to obscure examples of the disclosure, ribbon carriage 314 can deposit build material 304 on heating plate 302 prior to first time 317. For example, in the orientation illustrated in FIG. 3, ribbon carriage 314 can move back and forth in the y direction to deposit build material 304 on heating plate 302 in a substantially uniform manner.

Although the ribbon carriage 314 is described as depositing build material 304 on heating plate 302 prior to first time 317, examples of the disclosure are not so limited. In some examples, ribbon carriage 314 can deposit build material 304 on heating plate 302 during first time 317, or at a different time.

Heating plate 302-1 of the 3D printer can preheat build material 304-1 from below build material 304-1, where heating plate 302-1 is located adjacent to build platform 306-1 of the 3D printer. In some examples, following the deposit of build material 304-1 by ribbon carriage 314-1, heater-spreader carriage 308-1 can move towards build material 304-1. In some examples, while ribbon carriage 314 is depositing build material 304, heater spreader carriage 308-1 can move towards build material 304. In the orientation illustrated in FIG. 3, heater-spreader carriage 308-1 can move in the x direction towards build material 304-1.

At second time 319, heater-spreader carriage 308-2 has moved over build material 304-2. Prior to or at second time 319, heating plate 302-2 can preheat build material 304-2 from below build material 304-2 by conduction. Heating plate 302-2 can include a resistive heater (e.g., resistive heater 212, described in connection with FIG. 2). The resistive heater can be located below build material 304-2, and can preheat build material 304-2 from below build material 304-2 by conduction.

The resistive heater of heating plate 302-2 can preheat build material 304-2 for a predetermined time. For example, the resistive heater can preheat build material 304-2 for one second, although examples of the disclosure are not limited to one second as the predetermined preheat time. For example, the resistive heater can preheat build material 304-2 for less than one second or more than one second. The predetermined time can be configurable. That is, the resistive heater can preheat build material 304-2 for a configurable predetermined preheat time, which may depend on the material of build material 304-2 and/or the type of 3D part being created in build platform 306, among other factors.

The resistive heater can preheat build material 304-2 by conduction from a first temperature to a second temperature. For example, build material 304-1 may be deposited on heating plate 302-1 at a first temperature, where the first temperature can be, for example, an ambient temperature, a room temperature, an elevated temperature from build material being preheated while being transported to the heating plate, or a temperature of the environment of the system. The second temperature can be, for example, 100° C., although examples of the disclosure are not limited to a second temperature of 100° C. For example, the second temperature can be higher than 100° C. or lower than 100° C.

The resistive heater can preheat build material 304-2 by conduction from the first temperature to the second temperature. The second temperature can be a same temperature as the temperature of build material bed 306-2. For example, in order to prevent loss of heat in build platform 306-2, the second temperature can be the same as or close to the temperature in build platform 306-2 so as to prevent build platform 306 from gaining temperature (e.g., if build material 304 is preheated to too high a temperature) or losing temperature (e.g., if build material 304 is preheated to too low a temperature) when build material 304-2 is spread from heating plate 302 to build platform 306. The second temperature can be a temperature such that build material 304 does not fuse prior to being spread to build platform 306.

Heater-spreader carriage 308-2 can preheat build material 304-2 from above build material 304-2 by radiation. Heater-spreader carriage 308-2 can include a radiative heat source such as an IR lamp (not shown) to preheat build material 304-2 by infrared radiation. That is, the IR lamp of heater-spreader carriage 308-2 can preheat build material 304-2 from above via infrared radiation. The radiative heat source can be located above heating plate 302-2, and can preheat build material 304-2 from above build material 304-2 by radiation.

Although build material 304 is described as being preheated from above by radiation via an IR lamp, examples of the disclosure are not so limited. For example, build material 304 can be preheated by other types of radiation and/or radiative heat sources. For instance, a UV lamp may be utilized to preheat build material 304 from above build material 304, among other types of radiative heat sources.

In some examples, a fixed lamp can preheat build material 304-2 by radiation. For example, a lamp not included in heater-spreader carriage 308-2 can be in a fixed location above heating plate 302 and can preheat build material 304 from above build material 304 by radiation.

The radiative heat source of the heater-spreader carriage 308-2 can preheat build material 304-2 for a predetermined time. For example, the radiative heat source can preheat build material 304-2 for one second, although examples of the disclosure are not limited to one second as the predetermined preheat time. For example, the radiative heat source can preheat build material 304-2 for less than one second or more than one second.

The predetermined time can be configurable. That is, the radiative heat source can preheat build material 304-2 for a configurable predetermined preheat time, which may depend on the material of build material 304 and/or the type of 3D part being created in build platform 306, among other factors.

In some examples, a predetermined temperature may be determined automatically via a thermal probe, a camera, etc. For instance, the radiative heat source can preheat build material 304 until a predetermined temperature of build material 304 is reached, where the predetermined temperature may be determined via the thermal probe or camera, among other temperature sensors. The predetermined temperature can be a threshold temperature. For instance, the radiative heat source can preheat build material 304 until a threshold temperature of build material 304 is reached.

The radiative heat source can preheat build material 304-2 by radiation from a first temperature to a second temperature. For example, build material 304-1 may be deposited on heating plate 302-1 at a first temperature, where the first temperature can be, for example, an ambient temperature, a room temperature, an elevated temperature from build material being preheated while being transported to the heating plate, or a temperature of the environment of the system, among other first temperatures.

The radiative heat source can preheat build material 304-2 by radiation from the first temperature to the second temperature. In some examples, the second temperature can be a same temperature as the temperature of build platform 306-2. For example, in order to prevent loss of heat in build platform 306-2, the second temperature can be the same as or close to the temperature in build platform 306-2 so as to prevent build platform 306 from gaining temperature (e.g., if build material 304 is preheated to too high a temperature) or losing temperature (e.g., if build material 304 is preheated to too low a temperature) when build material 304-2 is spread from heating plate 302 to build platform 306. The second temperature can be a temperature such that powder 306 does not fuse prior to being spread to build platform 306.

The radiative heat source of heater-spreader carriage 308-2 can preheat build material 304-2 at a predetermined radiative heat source power level from the first temperature to the second temperature. The radiative heat source power level can be configurable based on the material of build material 304 and/or the type of 3D part being created in build platform 306, among other factors.

In some examples, the radiative heat source of heater-spreader carriage 308-2 and the resistive heater of heating plate 302 can preheat build material 304-2 for a same amount of time. In some examples, the radiative heat source of heater-spreader carriage 308-2 and the resistive heater of heating plate 302 can preheat build material 304-2 for different amounts of time. The length of time of preheating by the resistive heater of heating plate 302 and the radiative heat source of heater-spreader carriage 308 can be configurable based on the material of build material 304 and/or the type of 3D part being created in build platform 306, among other factors.

Heater-spreader carriage 308 can spread build material 304 from heating plate 302 to build platform 306. For example, at third time 321, heater-spreader carriage 308-3 can spread preheated build material from heating plate 302-3 to build platform 306-3 in response to build material being heated to the second temperature. That is, once build material 304 is heated from the first temperature to the second temperature, heater-spreader carriage 308 can spread build material 304 from heating plate 302 to build platform 306. Heater-spreader carriage 308-3 can spread build material to build platform 306-3 to create a layer in build platform 306-3 to create the 3D object in build platform 306-3.

The preheat sequence illustrated in FIG. 3 describes one example of a preheat sequence. However, examples of the disclosure are not limited to the preheat sequence described above. For example, the timing and positioning of the deposit of build material 304 on heating plate 302, ribbon carriage 314, heater-spreader carriage 308, and spread of build material 304 to build platform 306 can vary between different preheat sequences.

As shown in FIG. 3, the system can include a controller 305. Controller 305 can include a processing resource (not shown) and a memory resource (not shown). The memory resource can include machine readable instructions to cause a 3D printer to preheat 3D printer build material.

The processing resource may be a central processing unit (CPU), a semiconductor based microprocessor, and/or other hardware devices suitable for retrieval and execution of the machine-readable instructions stored in a memory resource. The processing resource may fetch, decode, and execute the instructions to cause a heating plate of the 3D printer to preheat a build material from below the build material, and a radiative heat source of the 3D printer to preheat the build material from above the build material. As an alternative or in addition to retrieving and executing the instructions, the processing resource may include a plurality of electronic circuits that include electronic components for performing the functionality of the instructions.

The memory resource may be any electronic, magnetic, optical, or other physical storage device that stores the executable instructions and/or data. Thus, the memory resource may be, for example, Random Access Memory (RAM), an Electrically-Erasable Programmable Read-Only Memory (EEPROM), a storage drive, an optical disc, and the like. The memory resource may be disposed within controller 305. Additionally and/or alternatively, the memory resource may be a portable, external or remote storage medium, for example, that allows controller 305 to download the instructions from the portable/external/remote storage medium.

Preheating 3D printer build material, according to the disclosure, can allow for build material to be preheated prior to being deposited in a build area of a 3D printer. Preheating a uniform build material deposit on a heating plate by radiation and by conduction can provide a fast preheat time, as well as provide for uniform heating in the build material so that the build material can bind effectively in the different layers of a 3D object being created by the 3D printer.

Figure 4:
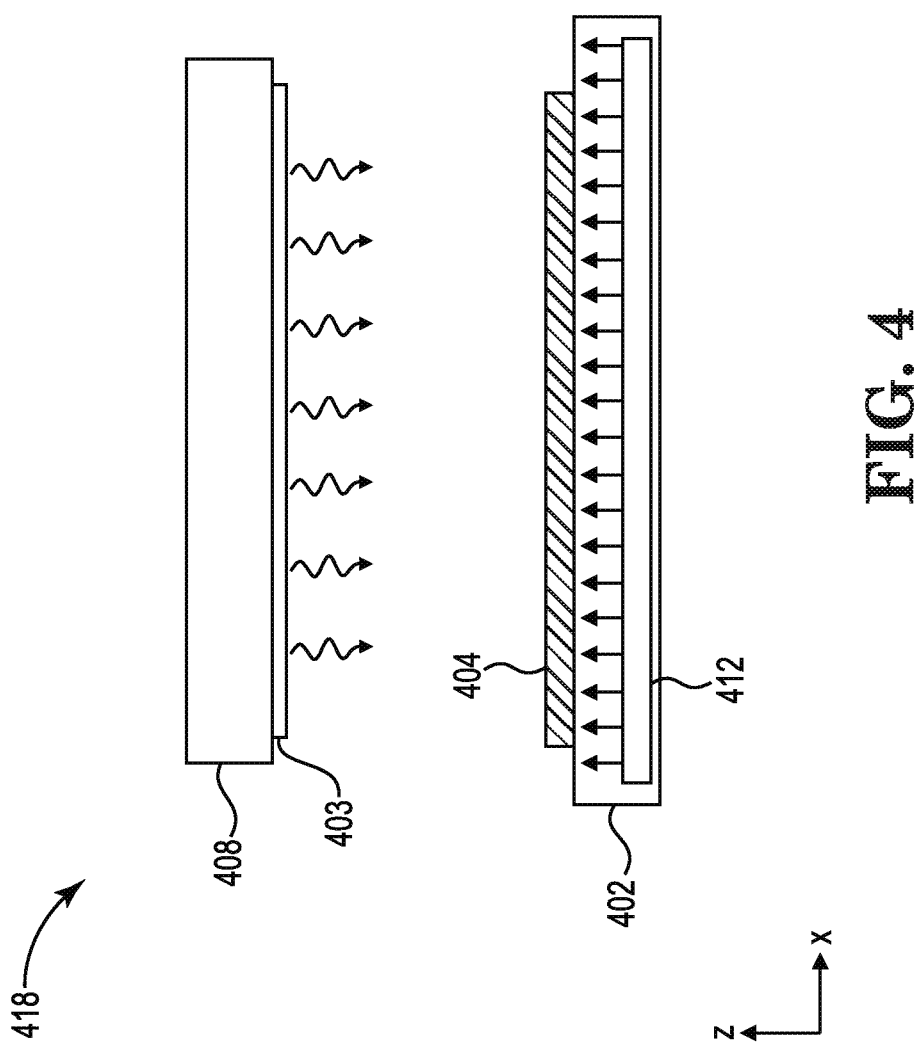
FIG. 4 illustrates a side view of an example of a system to preheat 3D printer build material consistent with the disclosure.

FIG. 4 illustrates a side view 418 of an example of a system to preheat 3D printer build material consistent with the disclosure. The system can include heating plate 402, build material 404, heater-spreader carriage 408, resistive heater 412, and radiative heat source 403.

As illustrated in FIG. 4, the side view 418 of the system can be oriented in an x-z coordinate plane. For example, the x coordinate as shown in FIG. 4 can be a length and the z coordinate as shown in FIG. 4 can be a height.

Build material 404 can be received by heating plate 402 from a ribbon carriage (e.g., ribbon carriage 214, 314, described in connection with FIGS. 2 and 3, respectively). Heating plate 402 can receive build material 404 at a first temperature.

Resistive heater 412 can preheat build material 404 from below by conduction. As shown in FIG. 4, resistive heater 412 can be located below build material 404. Resistive heater 412 can preheat build material 404 from below by conduction from a first temperature to a second temperature. The second temperature can be the same or substantially the same temperature as the build platform (e.g., build platform 106, 206, 306, previously described in connection with FIGS. 1-3, respectively).

Radiative heat source 403 of heater-spreader carriage 408 can preheat build material 404 from above by radiation. As shown in FIG. 4, radiative heat source 403 can be located above heating plate 402. Radiative heat source 403 can preheat build material 404 from above by radiation from a first temperature to a second temperature. The second temperature can be the same or substantially the same temperature as the build platform.

Build material 404 may be preheated by conduction and radiation simultaneously. For example, resistive heater 412 and radiative heat source 403 can preheat build material 404 from the first temperature to the second temperature by conduction and radiation, respectively, simultaneously.

Figure 5:
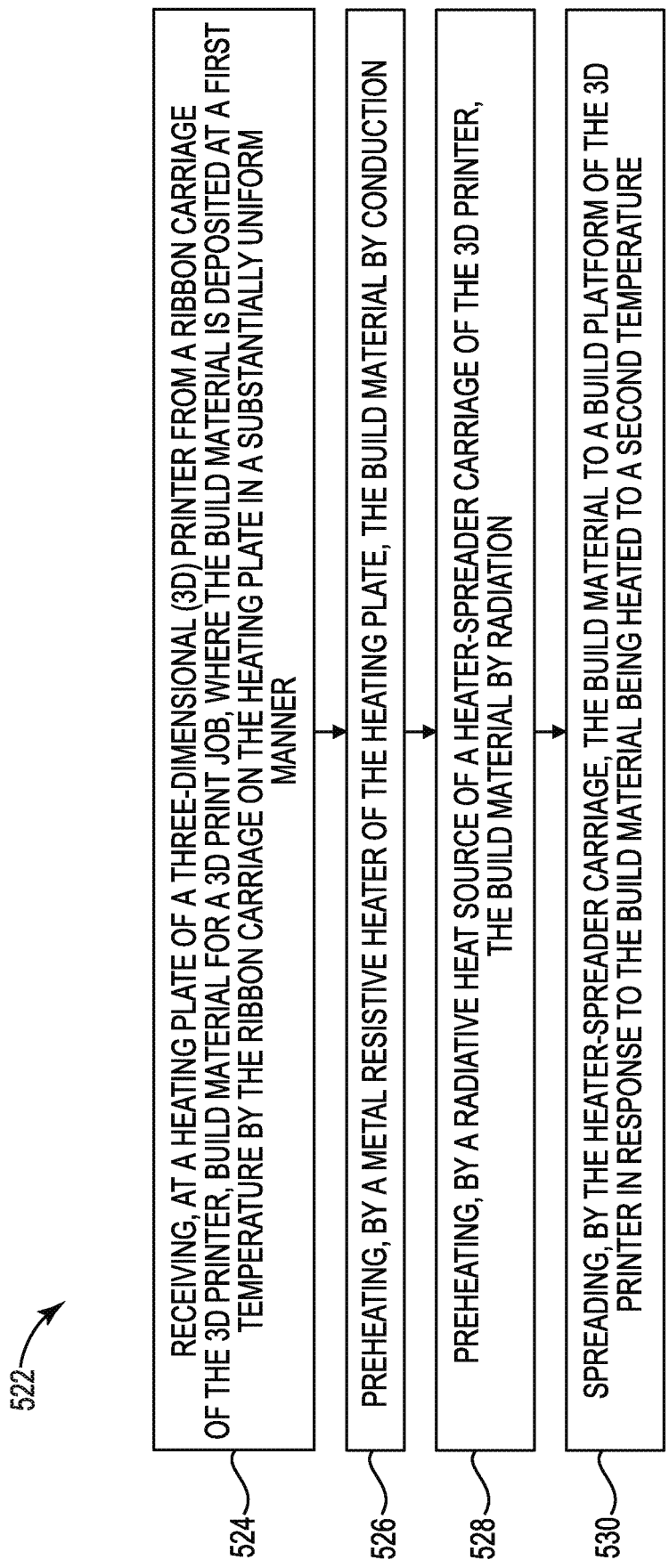
FIG. 5 illustrates an example of a method to preheat 3D printer build material consistent with the disclosure.

FIG. 5 illustrates an example of a method 522 to preheat 3D printer build material consistent with the disclosure. For example, method 220 may be performed by a heating plate (e.g., heating plate 102, 202, 302, 402, described in connection with FIGS. 1-4, respectively), a resistive heater (e.g., resistive heater 212, 412, described in connection with FIGS. 2 and 4, respectively), a heater-spreader carriage (e.g., heater-spreader carriage 308 and 408, described in connection with FIGS. 3 and 4, respectively), a radiative heat source (e.g., radiative heat source 103, 403, described in connection with FIGS. 1 and 4, respectively), a ribbon carriage (e.g., ribbon carriage 214, 314, described in connection with FIGS. 2 and 3, respectively), and a build platform (e.g., build platform 106, 206, 306, described in connection with FIGS. 1-3, respectively).

At 524, the method 522 includes receiving, at a heating plate of a 30 printer from a ribbon carriage of the 3D printer, build material for a 3D print job. The build material can be deposited at first temperature by the ribbon carriage on the heating plate in a substantially uniform manner.

At 526, the method 522 includes preheating, by a resistive heater of the heating plate, the build material by conduction. The resistive heater can preheat the build material by conduction from below the build material for a predetermined time. For example, the resistive heater can preheat the build material for one second, although examples of the disclosure are not limited to one second as the predetermined time.

In some examples, the method 522 can include preheating the build material by the resistive heater from the first temperature to a second temperature. The second temperature can be substantially the same temperature as the temperature of the build platform, although examples of the disclosure are not limited to substantially the same temperature as the temperature of the build platform.

At 528, the method 522 can include preheating, by radiative heat source of a heater-spreader carriage of the 3D printer, the build material by radiation. The radiative heat source can preheat the build material by radiation from above the build material for a predetermined time. For example, the radiative heat source can preheat the build material for one second, although examples of the disclosure are not limited to one second as the predetermined time.

In some examples, the method 522 can include preheating the build material by the radiative heat source from the first temperature to a second temperature. The second temperature can be substantially the same temperature as the temperature of the build platform, although examples of the disclosure are not limited to substantially the same temperature as the temperature of the build platform. The radiative heat source can preheat the build material by radiation at a predetermined radiative heat source power level from the first temperature to the second temperature. The predetermined radiative heat source power level can be configurable.

At 530, the method 522 can include spreading, by the heater-spreader carriage, the build material to a build platform of the 3D printer in response to the build material being heated to the second temperature. For example, once the build material has been heated to the second temperature, the heater-spreader carriage can spread the build material to the build platform to become a layer of a 3D object being created by the 3D printer.

As used herein, "logic" is an alternative or additional processing resource to perform a particular action and/or element described herein. Logic may include hardware. The hardware may include processing resources such as circuitry, which are distinct from machine readable instructions on a machine readable media. Further, as used herein, "a" thing may refer to one, or more than one of such things. For example, "a widget" may refer to one widget, or more than one widget.

The figures follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

Multiple analogous elements within one figure may be referenced with a reference numeral followed by a hyphen and another numeral or a letter. For example, 302-1 may reference element 02-1 in FIGS. 3 and 302-2 may reference element 02-2, which can be analogous to element 02-1. Such analogous elements may be generally referenced without the hyphen and extra numeral or letter. For example, elements 302-1 and 302-2 may be generally referenced as 302.

The above specification, examples and data provide a description of the method and applications, and use of the system and method of the present disclosure. Since many examples may be made without departing from the spirit and scope of the system and method of the present disclosure, this specification merely sets forth some of the many possible example configurations and implementations.

What is claimed is:

1. A system, comprising:
   a build platform of a three-dimensional (3D) printer;
   a heating plate of the 3D printer to preheat a building material from below the build material, wherein the heating plate is located adjacent to the build platform;
   a heater-spreader carriage of the 3D printer including a radiative heat source;
   a ribbon carriage of the 3D printer; and
   a controller, wherein the controller is to cause:
     the ribbon carriage to deposit the build material on the heating plate in a substantially uniform manner;
     the heater-spreader carriage to move over the heating plate such that the radiative heat source is to preheat the build material on the heating plate from above the build material to a predetermined temperature; and
     the heater-spreader carriage is to move the build material from the heating plate to the build platform in response to the build material reaching the predetermined temperature.

2. The system of claim 1, wherein the radiative heat source is to preheat the build material from above the build material by radiation.

3. The system of claim 1, wherein the radiative heat source is an infrared (IR) lamp to preheat the build material by infrared radiation.

4. The system of claim 1, wherein the heating plate preheats the build material from below the build material by conduction.

5. The system of claim 4, wherein the heating plate includes a resistive heater to preheat the build material by conduction.

6. A three-dimensional (3D) printer, comprising:
   a build platform;
   a heating plate including:
     a plate to receive a substantially uniform deposit of build material from a ribbon carriage of the 3D printer; and
     a resistive heater to preheat the substantially uniform deposit of build material by conduction, wherein the substantially uniform deposit of build material is preheated by the resistive heater from below the build material;
   a heater-spreader carriage including a radiative heat source;

a ribbon carriage; and a controller, wherein the controller is to cause:
- the ribbon carriage to deposit the build material on the heating plate in a substantially uniform manner;
- the heater-spreader carriage to move over the heating plate such that the radiative heat source is to preheat the build material on the heating plate from above the build material to a predetermined temperature; and
- the heater-spreader carriage to move the build material from the heating plate to the build platform in response to the build material reaching the predetermined temperature.

7. The 3D printer of claim 6, wherein the build material from the ribbon carriage of the 3D printer is received by the heating plate at a first temperature.

8. The 3D printer of claim 7, wherein:

the resistive heater preheats the build material from below by conduction from the first temperature to a second temperature, wherein the second temperature is the predetermined temperature; and the radiative heat source includes an infrared (IR) lamp to preheat the build material from above by radiation from the first temperature to the second temperature.

\* \* \* \* \*